US010913440B2

(12) United States Patent
Kim

(10) Patent No.: US 10,913,440 B2
(45) Date of Patent: Feb. 9, 2021

(54) PEDAL SIMULATOR

(71) Applicant: MANDO CORPORATION, Gyeonggi-do (KR)

(72) Inventor: Hyun Jun Kim, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 0 days.

(21) Appl. No.: 16/138,924

(22) Filed: Sep. 21, 2018

(65) Prior Publication Data
US 2019/0092307 A1 Mar. 28, 2019

(30) Foreign Application Priority Data
Sep. 25, 2017 (KR) .................. 10-2017-0123491

(51) Int. Cl.
B60T 7/06 (2006.01)
B60T 17/22 (2006.01)
B60T 7/04 (2006.01)
G05G 5/04 (2006.01)
G05G 5/05 (2006.01)
(Continued)

(52) U.S. Cl.
CPC ............ B60T 17/22 (2013.01); B60T 7/04 (2013.01); B60T 7/042 (2013.01); B60T 8/409 (2013.01); B60T 8/4081 (2013.01); B60T 8/4086 (2013.01); B60T 11/16 (2013.01); G05G 5/04 (2013.01); G05G 5/05 (2013.01); G05G 1/44 (2013.01); G05G 5/03 (2013.01)

(58) Field of Classification Search
CPC ....... B60T 8/409; B60T 8/4086; B60T 8/4081
See application file for complete search history.

(56) References Cited

U.S. PATENT DOCUMENTS 6,139,119 A   10/2000  Otomo
2014/0144732 A1*  5/2014  Bayer .................. B60T 8/409
                                                       188/106 P
(Continued)

FOREIGN PATENT DOCUMENTS

JP   2009-227172      10/2009
KR   10-2013-0052936   5/2013
KR   10-2015-0029052   3/2015

OTHER PUBLICATIONS

Office Action dated Oct. 26, 2018 for Korean Patent Application No. 10-2017-0123491 and its English machine translation by Google Translate.

Primary Examiner — Nicholas J Lane
(74) Attorney, Agent, or Firm — Ladas & Parry, LLP

(57) ABSTRACT

A pedal simulator is disclosed. The pedal simulator is connected to a master cylinder, receives hydraulic pressure corresponding to a pedal effort of a driver of a vehicle, and provides pedal feel to the driver. The pedal simulator includes a simulator block, an upper part of which includes an oil port connected to the master cylinder, configured to include a bore communicating with the oil port, and a reaction force portion provided in the bore, configured to be pressurized by oil introduced through the oil port during braking of the vehicle, and provide reaction force. An upper end of a reaction force piston of the reaction force portion that moves back to an original position thereof during release of the braking is provided with a buffering member formed of rubber by which the simulator block is not in contact with the upper end of the reaction force piston.

13 Claims, 4 Drawing Sheets

(51) Int. Cl.
  *B60T 11/16* (2006.01)
  *B60T 8/40* (2006.01)
  *G05G 5/03* (2008.04)
  *G05G 1/44* (2008.04)

(56) References Cited

U.S. PATENT DOCUMENTS

| | | | |
|---|---|---|---|
| 2015/0040557 A1* | 2/2015 | Murayama | B60T 8/4086 60/545 |
| 2015/0101447 A1* | 4/2015 | Kim | G05G 1/40 74/512 |
| 2016/0160892 A1* | 6/2016 | Schepp | F15B 1/24 92/85 A |
| 2017/0334416 A1* | 11/2017 | Ryu | B60T 8/4081 |
| 2019/0232934 A1* | 8/2019 | Weh | F15B 15/24 |

\* cited by examiner

PEDAL SIMULATOR

CROSS-REFERENCE TO RELATED APPLICATION

This application is based on and claims priority under 35 U.S.C. § 119 to Korean Patent Application No. 10-2017-0123491, filed on Sep. 25, 2017 in the Korean Intellectual Property Office, the disclosure of which is incorporated by reference in its entirety.

BACKGROUND

1. Field

Embodiments of the present disclosure relate to a pedal simulator, and more particularly to a pedal simulator for improving pedal feel for a vehicle driver.

2. Description of the Related Art

Generally, a brake system for braking of a vehicle is essentially mounted to a vehicle. In order to provide proper pedal feel for a vehicle driver during braking of the vehicle, an additional hydraulic pedal simulator (or also referred to as a pedal-feel simulator) is mounted to the brake system, such that stable pedal feel is provided to the driver.

The pedal simulator is connected to the master cylinder, and is pressurized by hydraulic pressure corresponding to a pedal effort of a brake pedal, thereby providing repulsive force to the brake pedal. In this case, the pedal simulator has been implemented in various ways using spring and a rubber damper, thereby providing reaction force in a similar way to a pedal simulator of a conventional brake system (CBS). Typically, the pedal simulator moves piston according to hydraulic pressure caused by a pedal effort applied to a brake pedal, and pressurizes the spring and/or the rubber damper through the piston, such that the pedal simulator can provide stable pedal feel to the driver who depresses the brake pedal through reaction force produced by pressurization of the spring and/or the rubber damper.

However, during release of such braking, an upper end of the piston that moves back to an original position thereof is in direct contact with a simulator block, unexpected noise and vibration occur, resulting in reduction of pedal feel for the driver who depresses the brake pedal. Specifically, the piston and a simulator block are formed of a metal material so as to maintain durability, noise caused by contact sound between the piston and the simulator block and vibration caused by impact of the piston and the simulator block are delivered to the driver through the brake pedal, such that the driver may feel a sense of difference or awkwardness during vehicle driving.

SUMMARY

Therefore, it is an aspect of the present disclosure to provide a pedal simulator for preventing direct contact between a reaction force piston and a simulator block during release of vehicle braking, such that awkwardness or sense of difference felt by a vehicle driver is minimized, resulting in improvement of pedal feel.

Additional aspects of the invention will be set forth in part in the description which follows and, in part, will be obvious from the description, or may be learned by practice of the invention.

In accordance with an aspect of the present disclosure, a pedal simulator is connected to a master cylinder, receives hydraulic pressure corresponding to a pedal effort of a driver of a vehicle, and provides pedal feel to the driver. The pedal simulator includes a simulator block, an upper part of which includes an oil port connected to the master cylinder, configured to include a bore communicating with the oil port, and a reaction force portion provided in the bore, configured to be pressurized by oil introduced through the oil port during braking of the vehicle, and provide reaction force. An upper end of a reaction force piston of the reaction force portion that moves back to an original position thereof during release of the braking is provided with a buffering member formed of rubber by which the simulator block is not in contact with the upper end of the reaction force piston.

The upper end of the reaction force piston may include a coupling groove provided with a stepped portion, such that the buffering member is installed in the coupling groove.

The buffering member may include a body portion formed to be inserted into the coupling groove in a manner that one end of the body portion protrudes from the reaction force piston, and a separation prevention portion formed to extend radially from the other end of the body portion, and supported by the stepped portion to prevent the body portion from being separated from the coupling groove.

The buffering member may be elastically deformed and is inserted into the coupling groove, and may include a center hole formed at a center part of the body portion such that the elastic deformation of the buffering member is easily achieved.

The buffering member may further include a plurality of slot portions formed in a longitudinal direction along a circumference of the buffering member in a manner that air between the coupling groove and the buffering member is easily discharged during an air bleeding process of the pedal simulator.

The pedal simulator may further include a reaction force piston slidably installed in the bore, a first damping member installed to the reaction force piston in a manner that the first damping member moves along with the reaction force piston, configured to be elastically deformed by pressurization so as to provide reaction force, a support member formed to be supported by a reaction force spring, one end of which is in contact with a first damping member and the other end of which provides reaction force, and a second damping member arranged to be in contact with the support member, configured to be elastically deformed during pressurization and movement of the support member, and thus provide reaction force.

The support member may include a circular plate supported by the reaction force spring and the second damping member, and a protrusion formed to extend from a center part of the circular plate to the first damping member. In order to provide force by which the reaction force piston moves back to an original position thereof, the protrusion is formed to come into press contact with the first damping member in a normal state, and allows the first damping member to remain pressed in the normal state.

The pedal simulator may further include a damping housing formed to support the second damping member, and coupled to the bore in a manner that the bore is sealed.

The pedal simulator may further include a stopper member mounted to a lower end of the damping housing in a manner that the damping housing is fixed to the bore.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
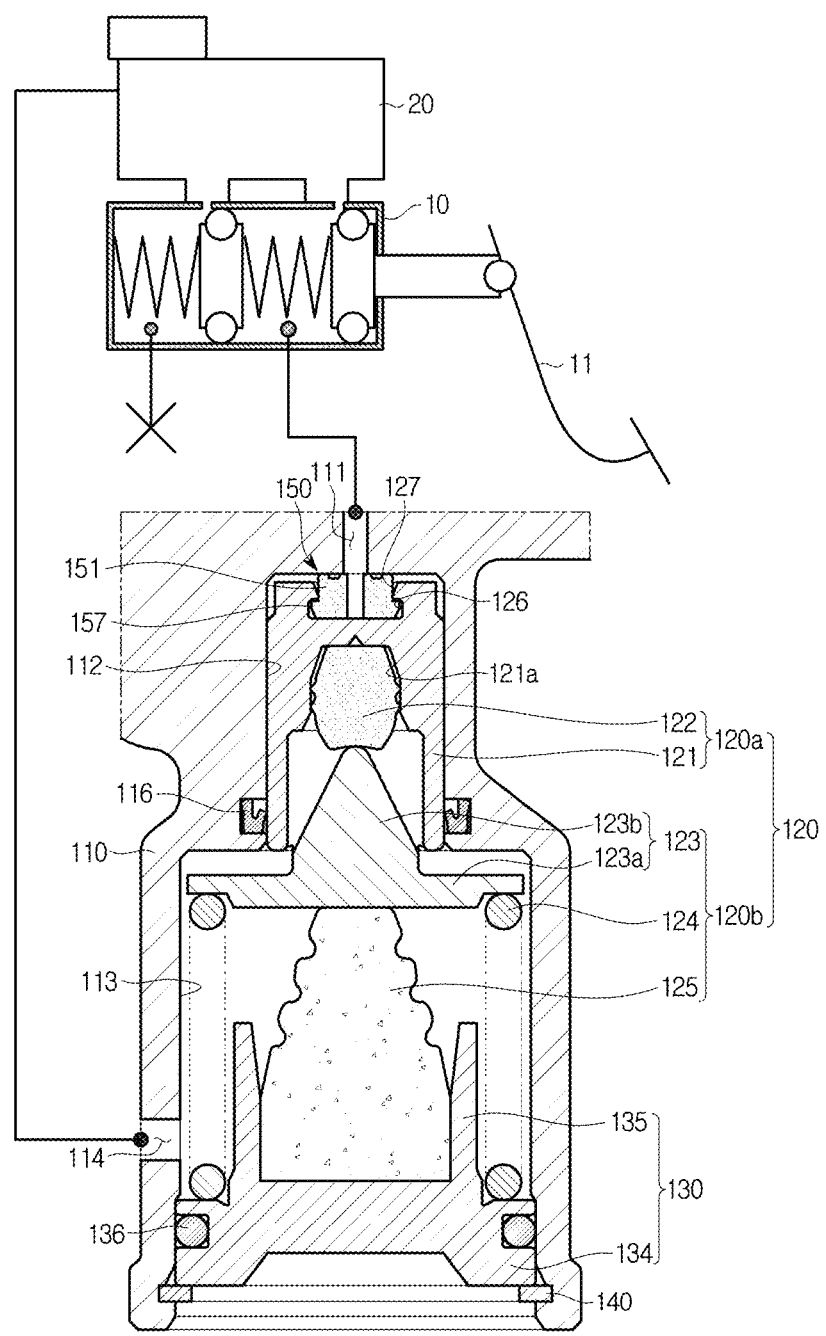
FIG. 1 is a cross-sectional view illustrating a pedal simulator according to an embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

Figure 2:
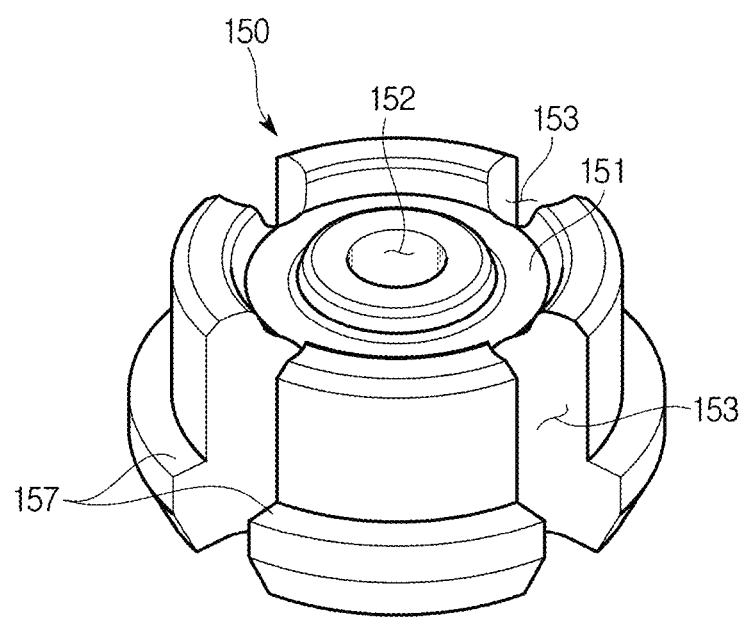
FIG. 2 is a perspective view illustrating a buffering member provided in the pedal simulator according to an embodiment of the present disclosure.

FIG. 1 is a cross-sectional view illustrating a pedal simulator according to an embodiment of the present disclosure. FIG. 2 is a perspective view illustrating a buffering member provided in the pedal simulator according to an embodiment of the present disclosure.

Referring to FIGS. 1 and 2, the pedal simulator 100 may include a simulator block 110, a reaction force portion 120, and a buffering member 150. The simulator block 110 may be connected to a master cylinder 10 configured to generate braking hydraulic pressure by a brake pedal 11, may receive oil from the master cylinder 10, and may store the received oil therein. The reaction force portion 120 may be mounted to the simulator block 100, thereby providing pedal feel. The buffering member 150 may be mounted to a reaction force piston 121 of the reaction force portion 120. In accordance with one aspect of the present disclosure, the reaction force portion 120 may have a two-stage damping structure such that the reaction force portion 120 provides low repulsive force in an initial braking period and provides high repulsive force in the last braking period using the two-stage damping structure. That is, the reaction force portion 120 may include a first reaction force portion 120a and a second reaction force portion 120b. In addition, the first reaction force portion 120a and the second reaction force portion 120b may be connected in series to each other in bores 112 and 113 formed in the simulator block 110.

The simulator block 110 may include an oil port 111 through which hydraulic pressure is introduced from the master cylinder 10. The oil port 111 may be located at an upper part of the simulator block 110. The simulator block 110 may include bores 112 and 113 communicating with the oil port 111. The bores 112 and 113 may include the first bore 112 in which the first reaction force portion 120a is disposed and the second bore 113 in which the second reaction force portion 120b is disposed. Here, the first bore 112 and the second bore 113 may be formed in a stepped shape. As shown in FIG. 1, the first bore 112 may be formed to have a smaller diameter than the second bore 113.

An oil passage 114 may be provided at one side of the second bore 113. The oil passage 114 may be connected to a reservoir 20 such that oil is introduced or discharged through the oil passage 114 according to operation of the pedal simulator 100. A lower end of the second bore 113 may be sealed by a damping housing 130. In this case, the oil passage 114 may be disposed below a support member 123 of the second reaction force portion 120b to be described, such that the reaction force piston 121 and the support member 123 of the reaction force portion 120 can be pressurized and flow of oil in the bores 112 and 113 can be facilitated.

The reaction force portion 120 may include a reaction force piston 121, a first damping portion 122, a support member 123, a reaction force spring 124, and a second damping member 125. In addition, as described above, the reaction force portion 120 includes the first reaction force portion 120a and the second reaction force portion 120b.

In more detail, the first reaction force portion 120a may include the first reaction force piston 121 slidably movable in the first bore 112, and the first damping portion 122 movable along with the reaction force piston 121.

When oil is introduced through the oil port 111, the reaction force piston 121 may move downward. A damper mounting groove 121a concaved upward may be formed at a lower side of the reaction force piston 121. The first damping member 122 may be mounted to the damper mounting groove 121a, such that the reaction force piston 121 can move along with the first damping member 122.

Meanwhile, a coupling groove 126 concaved downward may be formed at the upper end of the reaction force piston 121. The coupling groove 126 may be formed in a stepped shape, and a stepped portion 127 may be disposed in the coupling groove 126. The buffering member 150 may be disposed in the coupling groove 126, and may thus prevent direct contact between the reaction force piston 121 and the simulator block 110. The coupling structure between the buffering member 150 and the coupling groove 126 and a detailed description of the buffering member 150 will hereinafter be given.

The first damping member 122 may be formed of rubber such that the first damping member 122 can be elastically deformed. Since the first damping member 122 may be elastically deformed by pressurization, the first damping member 122 may provide reaction force to the brake pedal 11. In addition, the lower end of the first damping member 122 mounted to the damper mounting groove 121a may be arranged to come into press contact with the support member 123 in a normal state, and may thus remain pressed in the normal state. As a result, it may be possible to guarantee restoring force through which the reaction force piston 121 that has moved to another position by pressurization can move back to the original position thereof.

The second reaction force portion 120b may be provided in the second bore 113 disposed between the first reaction force portion 120a and the damping housing 130. In more detail, the second reaction force portion 120b may include a support member 123, a reaction force spring 124, and a second damping member 125. The support member 123 may be disposed in the second bore 113, and may slidably move in the second bore 113. The reaction force spring 124 may be disposed between the support member 123 and the damping housing 130. The second damping member 125 may be mounted to the damping housing 130, and may be in contact with the support member 123.

The support member 123 may include a circular plate 123a and a protrusion 123b. The circular plate 123a may be supported by the second damping member 125 and the reaction force spring 124 that are disposed below the circular plate 123a. The protrusion 123b may extend from the center part of a top surface of the circular plate 123a to the first damping member 122.

The circular plate 123a may be spaced apart from the lower end of the reaction force piston 121 by a predetermined distance. The protrusion 123b may extend upward from the center part of the top surface of the circular plate 123a to the first damping member 122 disposed in the reaction force piston 121.

The upper end of the protrusion 123b may be formed to come into press contact with the lower end of the first damping member 122, such that the lower end of the first damping member 122 may remain pressed when the reaction force piston 121 does not move.

The reaction force spring 124 may be formed in a coil shape, thereby providing reaction force to the brake pedal 11. One end of the reaction force spring 124 may be supported by the lower end of the circular plate 123a, and the other end of the reaction force spring 124 may be supported by the damping housing 130. The reaction force spring 124 may be compressed by movement of the support member 123, thereby providing reaction force.

The second damping member 125 may be formed of rubber such that the first damping member 125 can be elastically deformed. The second damping member 125 may be in contact with the support member 123. The second damping member 125 may be supported by the damping housing 130 sealing the second bore 113, and may provide reaction force to the brake pedal 11 after being pressurized by the support member 123. Although the second damping member 125 is in contact with the support member 123 in an initial state, the scope or spirit of the present disclosure is not limited thereto, the support member 123 may move downward by a predetermined distance, such that the support member 123 may be in contact with the second damping member 125.

The damping housing 130 may be spaced apart from the support member 123 by a predetermined distance, such that the damping housing 130 may be assembled with the lower end of the second bore 113. The damping housing 130 may include a boss portion 135 and a flange portion 134. The boss portion 135 may be formed in a cylindrical shape, an upper part of which is opened. The flange portion 134 may extend radially from the circumference of a lower side of the boss portion 135.

The boss portion 135 may include a space therein, and the second damping member 125 may be disposed in the space.

The flange portion 134 may be assembled with the lower end of the second bore 113, and a top surface of the flange portion 134 may support the lower end of the reaction force spring 124. The boss portion 135 may be integrated with the flange portion 134.

A stopper member 140 may be mounted to the lower end of the damping housing 130 such that the damping housing 130 is stably fixed to the simulator block 110. Thus, the damping housing 130 may be fastened by the stopper member 140, such that the damping housing 130 can be strongly fixed to the stopper member 140.

Meanwhile, reference numeral '116' not illustrated is a sealing member for sealing a gap between the first bore 112 and the reaction force piston 121, and reference numeral '136' not illustrated is a sealing member for sealing a gap between the second bore 113 and the damping housing 130.

The first reaction force portion 120a and the second reaction force portion 120b of the pedal simulator 100 are coupled in series to each other, such that the first reaction force portion 120a and the second reaction force portion 120b can be serially operated during operation of hydraulic pressure.

Figure 3:
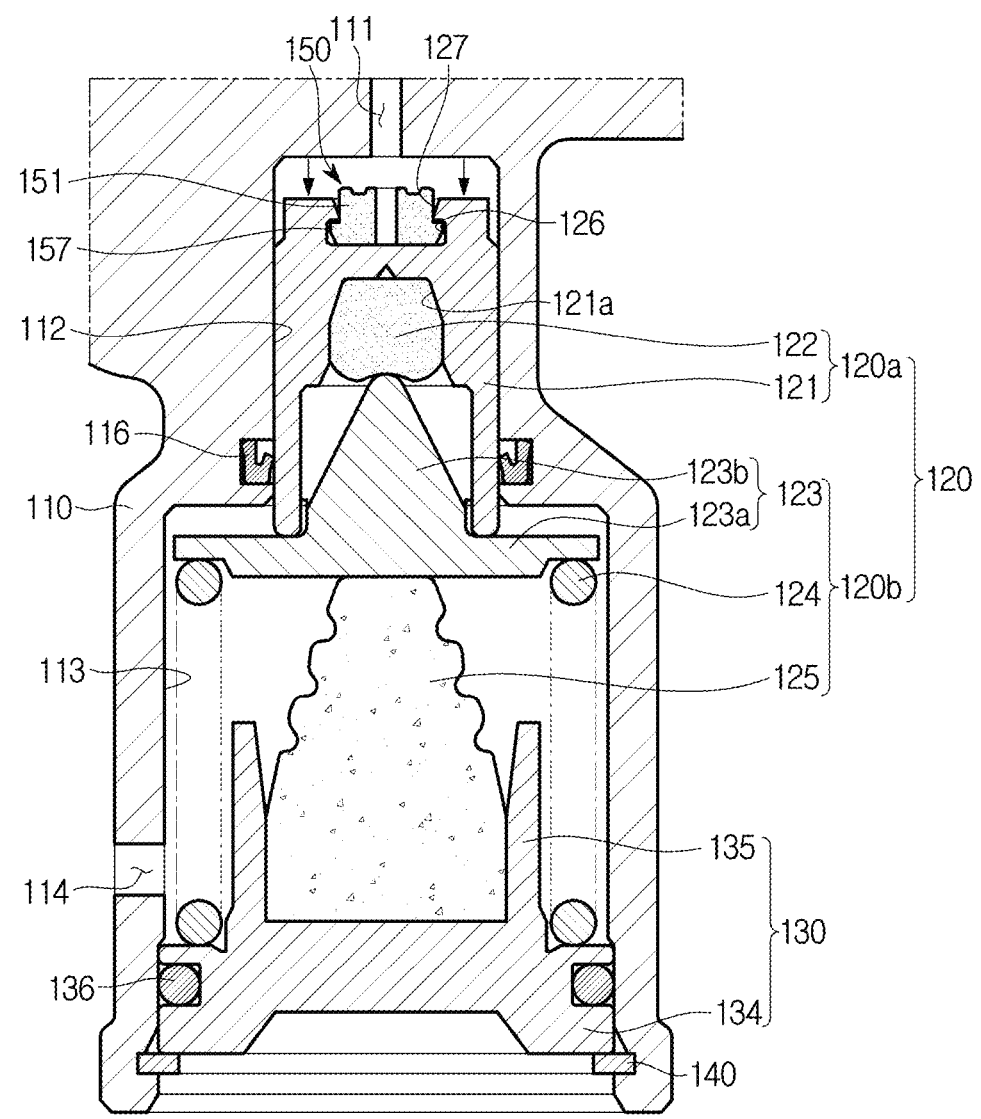
FIGS. 3 and 4 are views illustrating operation states of the pedal simulator according to the embodiment of the present disclosure.
Figure 4:
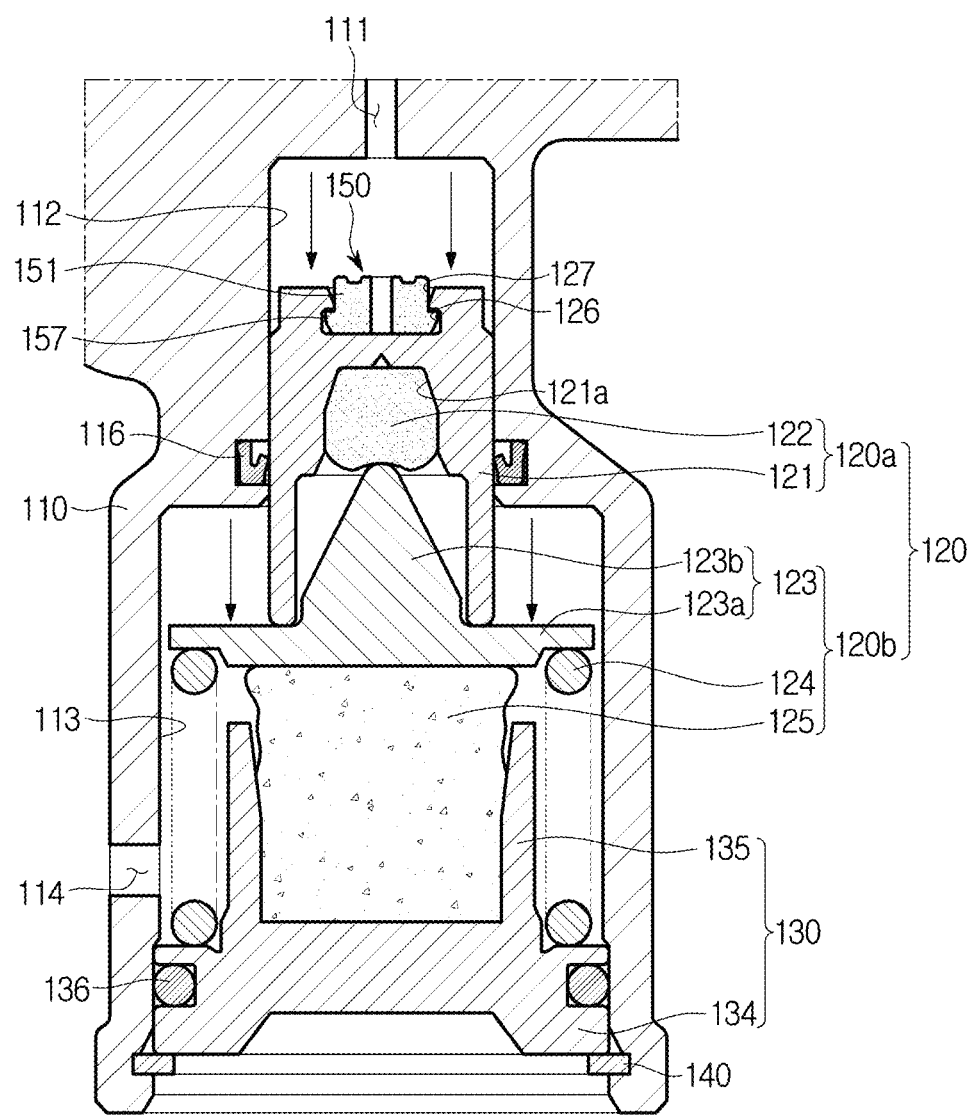

FIGS. 3 and 4 are views illustrating operation states of the pedal simulator according to the embodiment of the present disclosure.

Referring to FIGS. 1 and 3, when the reaction force piston 121 is pressurized by hydraulic pressure during braking of the vehicle, the reaction force piston 121 moves by a predetermined distance and the support member 123 is then pushed. In other words, when the reaction force piston 121 moves after being pressurized by hydraulic pressure during braking of the vehicle, the first damping member 122 may be elastically deformed by the protrusion 123b of the support member 123, thereby providing primary reaction force. The reason why the first damping member 122 provides the primary reaction force is that the support member 123 is supported by the reaction force spring 124 and the second damping member 125 and elastic force between the reaction force spring 124 and the second damping member 125 is higher than elastic force of the first damping member 122. In addition, as shown in FIG. 4, when the support member 123 is pressurized by the reaction force piston 121 continuously moving, secondary reaction force generated when the support member 123 compresses the reaction force spring 124 and the second damping member 125 is supplied to the brake pedal 11.

If the above-mentioned braking operation is first carried out and is then released, the support member 123 moves back to the original position thereof by elastic restoring force of the second damping member 125 and the reaction force spring 124. In addition, the support member 123 pressurizes the first damping member 122 while simultaneously moving back to the original position thereof, such that the reaction force piston 121 moves back to the original position thereof. In this case, the first damping member 122 is slightly pressed by the protrusion 123b of the support member 123, such that the reaction force piston 121 can smoothly move back to the original position thereof.

Referring back to FIGS. 1 and 2, the pedal simulator according to one aspect of the present disclosure may include the buffering member 150 formed of rubber in a manner that the upper end of the reaction force piston 121 is not in direct contact with the simulator block 110 when the reaction force piston 121 moves back to the original position thereof during release of the braking operation.

The buffering member 150 may be mounted to the coupling groove 126 formed at the upper side of the reaction force piston 121. When the reaction force piston 121 moves back to the original position thereof, the buffering member 150 may be in contact with the simulator block 110, thereby absorbing impact or vibration. In more detail, the buffering member 150 may include a body portion 151 and a separation prevention portion 157. The body portion 151 may be inserted into the coupling groove 126 in a manner that one end of the body portion 151 may protrude from the top surface of the reaction force piston 121. The separation prevention portion 157 may extend radially from the other end of the body portion 151.

The body portion 151 may be formed in a cylindrical shape such that the cylindrical body portion 151 is inserted into the coupling groove 126. The body portion 151 may be formed to have a longer length than the depth of the coupling groove 126. Thus, when the body portion 151 is coupled to the coupling groove 126, one end of the body portion 151 may protrude from the top surface of the reaction force piston 121. As a result, the top surface of the reaction force piston 121 is not in direct contact with the simulator block 110.

The separation prevention portion 157 may prevent the buffering member 150 from being separated from the reaction force piston 121. The separation prevention portion 157 may be supported by the stepped portion 127 formed by a stepped shape of the coupling groove 126.

Meanwhile, the stepped portion 127 is provided at an inlet of the coupling groove 126 to be coupled to the buffering member 150, and the buffering member 150 is elastically deformed by the stepped portion 127 such that the buffering member 150 can be coupled to the coupling groove 126. In this case, a center hole 152 may be formed at the center of the body portion 151 such that the buffering member 150 can be easily coupled to the coupling groove 126. Thus, the buffering member 150 is elastically deformed to be compressed in the central direction thereof, such that the buffering member 150 is coupled to the coupling groove 126.

In addition, the brake system requires an air bleeding process to perform stable braking of the vehicle. For stable braking of the vehicle, the air bleeding process may allow air to be removed from the master cylinder 10 and the pedal simulator 100, each of which is designed to be filled with oil. For the air bleeding process, a slot portion 153 may be formed in a manner that air between the buffering member 150 and the coupling groove 126 can be easily discharged due to the coupling structure between the buffering member 150 and the reaction force piston 121 (i.e., the coupling structure between the separation prevention portion 157 and the stepped portion 127). Herein, a plurality of slot portions 153 may be formed in a longitudinal direction along the circumference of the body portion 151.

As described above, the buffering member 150 is provided at the upper end of the reaction force piston 121, such that the buffering member 150 prevents contact between the reaction force piston 121 and the simulator block 110 during release of the braking operation, and thus noise and vibration caused by such contact can be minimized. As a result, awkwardness or sense of difference to be felt by the driver can be minimized and pedal feel of the driver can be improved. In addition, the two-stage damping structure is provided such that improved pedal feel is provided to the driver during braking of the vehicle.

As is apparent from the above description, the pedal simulator according to the embodiment of the present disclosure may include a buffering member configured to prevent direct contact between a reaction force piston and a simulator block that are formed of a metal material, may prevent noise and vibration caused by such direct contact, and may minimize awkwardness or sense of difference felt by a vehicle driver who depresses a brake pedal, resulting in improvement in pedal feel.

The pedal simulator according to the embodiment of the present disclosure is configured to have a two-stage damping structure, such that the pedal simulator provides low repulsive force in an initial braking period and provides high repulsive force in the last braking period, resulting in improvement in pedal feel.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A pedal simulator that is connected to a master cylinder, receives hydraulic pressure corresponding to a pedal effort of a driver of a vehicle, and provides pedal feel to the driver, the pedal simulator comprising:
    a simulator block, an upper part of which includes an oil port connected to the master cylinder, configured to include a bore communicating with the oil port; and
    a reaction force portion provided in the bore, configured to be pressurized by oil introduced through the oil port during braking of the vehicle, and provide reaction force,
    wherein:
    an upper end of a reaction force piston of the reaction force portion that moves back to an original position thereof during release of the braking is provided with a buffering member by which the simulator block is not in contact with the upper end of the reaction force piston,
    the upper end of the reaction force piston includes a coupling groove provided with a stepped portion such that the buffering member is installed in the coupling groove, the buffering member includes:
    a body portion formed to be inserted into the coupling groove in a manner that one end of the body portion protrudes from the reaction force piston; and
    a separation prevention portion formed to extend radially from the other end of the body portion, and supported by the stepped portion so as to prevent the body portion from being separated from the coupling groove, and the buffering member is elastically deformed.

2. The pedal simulator according to claim 1, wherein the buffering member is formed of rubber.

3. The pedal simulator according to claim 1, wherein:
    the buffering member is inserted into the coupling groove, and includes a center hole formed at a center part of the body portion.

4. The pedal simulator according to claim 1, wherein the buffering member further includes:
    a plurality of slot portions formed in a longitudinal direction along a circumference of the buffering member.

5. The pedal simulator according to claim 1, wherein:
    the reaction force piston is slidably installed in the bore, and
    the reaction force portion further comprises:
    a first damping member installed to the reaction force piston in a manner that the first damping member moves along with the reaction force piston, configured to be elastically deformed by pressurization so as to provide reaction force;
    a support member formed to be supported by a reaction force spring, one end of which is in contact with the first damping member and the other end of which provides reaction force; and
    a second damping member arranged to be in contact with the support member, configured to be elastically deformed during pressurization and movement of the support member, and thus provide reaction force.

6. The pedal simulator according to claim 5, wherein the support member includes:
    a circular plate supported by the reaction force spring and the second damping member; and
    a protrusion formed to extend from a center part of the circular plate to the first damping member,
    wherein, in order to provide force by which the reaction force piston moves back to an original position thereof, the protrusion is formed to come into press contact with the first damping member in a normal state, and allows the first damping member to remain pressed in the normal state.

7. The pedal simulator according to claim 5, further comprising:
a damping housing formed to support the second damping member, and coupled to the simulator block in a manner that the bore is sealed.

8. The pedal simulator according to claim 7, further comprising:
a stopper member mounted to a lower end of the damping housing in a manner that the damping housing is fixed to the bore.

9. A pedal simulator that is connected to a master cylinder, receives hydraulic pressure corresponding to a pedal effort of a driver of a vehicle, and provides pedal feel to the driver, the pedal simulator comprising:
a simulator block, an upper part of which includes an oil port connected to the master cylinder, configured to include a bore communicating with the oil port; and
a reaction force portion provided in the bore, configured to be pressurized by oil introduced through the oil port during braking of the vehicle, and provide reaction force,
wherein:
an upper end of a reaction force piston of the reaction force portion that moves back to an original position thereof during release of the braking is provided with a buffering member by which the simulator block is not in contact with the upper end of the reaction force piston,
the upper end of the reaction force piston includes a coupling groove such that the buffering member is installed in the coupling groove,
the buffering member is inserted into the coupling groove, and includes a center hole formed at a center part of the buffering member, and
the buffering member is elastically deformed.

10. The pedal simulator according to claim 9, wherein the buffering member is formed of rubber.

11. A pedal simulator that is connected to a master cylinder, receives hydraulic pressure corresponding to a pedal effort of a driver of a vehicle, and provides pedal feel to the driver, the pedal simulator comprising:
a simulator block, an upper part of which includes an oil port connected to the master cylinder, configured to include a bore communicating with the oil port; and
a reaction force portion provided in the bore, configured to be pressurized by oil introduced through the oil port during braking of the vehicle, and provide reaction force,
wherein
an upper end of a reaction force piston of the reaction force portion that moves back to an original position thereof during release of the braking is provided with a buffering member by which the simulator block is not in contact with the upper end of the reaction force piston,
the upper end of the reaction force piston includes a coupling groove such that the buffering member is installed in the coupling groove, and
the buffering member is inserted into the coupling groove, and includes a plurality of slot portions formed in a longitudinal direction along a circumference of the buffering member.

12. The pedal simulator according to claim 11, wherein:
the buffering member is elastically deformed.

13. The pedal simulator according to claim 12, wherein:
the buffering member is formed of rubber.

* * * * *